US011535573B2

(12) United States Patent
Loyola Irribarra et al.

(10) Patent No.: US 11,535,573 B2
(45) Date of Patent: Dec. 27, 2022

(54) VEHICLE ADAPTED FOR MAKING MIXTURES OF WASTE LUBRICATING OIL/FUEL OIL FOR THE IN SITU PRODUCTION OF BULK PRODUCTS, AND ASSOCIATED PROCESS

(71) Applicant: ENAEX SERVICIOS S.A., Santiago (CL)

(72) Inventors: Luis Antonio Loyola Irribarra, Santiago (CL); Camilo Garcia G., Santiago (CL); Fernando Zangheri G., Santiago (CL); Diego Mendez A., Santiago (CL)

(73) Assignee: ENAEX SERVICIOS S.A., Santiago (CL)

( * ) Notice: Subject to any disclaimer, the term of this patent is extended or adjusted under 35 U.S.C. 154(b) by 1162 days.

(21) Appl. No.: 16/062,856

(22) PCT Filed: Dec. 15, 2016

(86) PCT No.: PCT/CL2016/050070
§ 371 (c)(1),
(2) Date: Sep. 27, 2018

(87) PCT Pub. No.: WO2017/100960
PCT Pub. Date: Jun. 22, 2017

(65) Prior Publication Data
US 2019/0084899 A1  Mar. 21, 2019

Related U.S. Application Data

(60) Provisional application No. 62/267,679, filed on Dec. 15, 2015.

(51) Int. Cl.
*C06B 21/00* (2006.01)
*B60P 3/22* (2006.01)
(Continued)

(52) U.S. Cl.
CPC .......... *C06B 21/0091* (2013.01); *B01D 29/50* (2013.01); *B60P 1/00* (2013.01);
(Continued)

(58) Field of Classification Search
None
See application file for complete search history.

(56) References Cited

U.S. PATENT DOCUMENTS 5,397,405 A * 3/1995 Smith .................. C06B 31/285
149/46
5,573,656 A * 11/1996 Santos ................... C10G 17/06
208/182
(Continued)

*Primary Examiner* — Aileen B Felton

(57) ABSTRACT

The invention relates to a transport vehicle designed preferably for producing a mixture of waste lubricating oils/fuel oil (ALR/FO), mounted preferably on a chassis and comprising at least one metal tank. The metal tank is divided internally into at least two compartments having respective wave-breaks, wherein each compartment comprises a pump system, a plurality of lines for recharging products, at least one quick-filling system for respective FO and ALR compartments, at least one manual traditional filling system, and the vehicle comprises at least one logical control system having at least one actuating panel, at least one actuating reel for the actuation of at least one hose, and at least one static mixer for the ALR/FO mixture having an overpressure safety system, wherein said safety system includes a recirculation system to the ALR compartment, a plurality of double-acting vent valves, at least one man access, at least one battery, a plurality of filters for the suction of recycled oils and at least two filters for direct supply to manufacturing equipment. The invention also relates to an associated process.

12 Claims, 3 Drawing Sheets

(51) Int. Cl.
B01D 29/50 (2006.01)
B60P 1/00 (2006.01)
B60P 3/24 (2006.01)

(52) U.S. Cl.
CPC ........... B60P 3/2205 (2013.01); B60P 3/2235 (2013.01); B60P 3/24 (2013.01)

(56) References Cited

U.S. PATENT DOCUMENTS

2007/0175511 A1* 8/2007 Doerr .................. G05D 11/132
  208/370
2015/0033969 A1* 2/2015 Gore ....................... C06B 43/00
  149/46

* cited by examiner

VEHICLE ADAPTED FOR MAKING MIXTURES OF WASTE LUBRICATING OIL/FUEL OIL FOR THE IN SITU PRODUCTION OF BULK PRODUCTS, AND ASSOCIATED PROCESS

FIELD OF THE INVENTION

The present invention relates to a transport vehicle and an associated process, where the vehicle is intended for the production of ALR/FO (Waste Lubricating Oils/Fuel Oil) mixtures for the manufacture of bulk explosives in situ

BACKGROUND

Over the past several years, global oil prices have been rising, due to increased demand and limited resources. Oil is used in many of the stages of mining processes, including the transportation of materials, meaning that a large quantity of oil is generated in situ. As this oil has no new use, it is considered a contaminant for the environment. Furthermore, these oils create waste storage problems, as removing them is costly and time is needed to manage and process waste management permits. One effective way of removing these oils is by recycling and reusing them in other processes. Recycling plants have made it possible for oil to be replaced with recycled oil for the manufacture of explosives, with savings of between US$400,000 and 750,000 per year, depending on the percentage of oil replacement. These oils are known as waste lubricating oils (ALRs).

During the explosives manufacturing process, oils from the operation of mining equipment must be filtered during the collection stage. This stage is preferably carried out through two filtering lines that start the process at 150 microns, continue at 125 microns, and finish at 105 microns.

During this explosives manufacturing process, degreasing agents and active tensile agents, such as detergents or others, must not be added. Oils intended for this purpose should not be mixed with waste oils, paraffins, or benzines that could affect the stability of the matrix. If the ALR is combined with water, water separation must be performed through phase separation. Due to this, the filtering equipment has a blocked lance perforated from 40 cm to only allow the suction of the oil phase. Subsequently, evacuation is carried out using a "wiggins" system and must be transferred immediately to a tank. A bottom dewatering system is preferably available to remove water and precipitated sludge, recommended to maximize the efficiency of the process.

The problem with this type of filtering process is that most of it is carried out in fixed plants or plants installed on site. This makes the process inflexible, as it is limited to the capacity of the installed plant. In addition, a permanent supply of trucks with the necessary inputs for the manufacture of explosives is required, making the process inefficient.

In this sense, the state of the art has proposed mobile solutions, both in terms of transport and the manufacture of explosives. For example, document CN1202390344 describes a heavy and versatile ANFO mixing vehicle, including a body and chassis. The vehicle also includes main storage systems and an auxiliary storage system, a dual-mixing system and a control system. It also includes a pump system, a hopper, an ammonium nitrate tank, where the storage systems include an auxiliary diesel tank, a sensitizing solution tank and a pumpable water tank. This type of configuration allows multiple types of explosives to be mixed and loaded and can be carried out by using different combinations of different raw materials from the storage tanks, and by means of outlet pipes and diffuser plates.

A similar solution is presented in document CN103319288. This document refers to a vehicle adapted for mixing, which includes the vehicle body, chassis, which also includes: main silo systems and auxiliary silo systems, auger mixing system and control system. The vehicle also has a feed recirculation system for silo systems, an ammonium nitrate silo and storage of physical density modifiers, and each silo in each compartment is provided with a partition plate that divides the auxiliary storage systems into two separate parts, including a diesel tank, a sensitizer tank, a clean water tank, with respective recirculation systems. The vehicle also includes an auger mixing system for mixing explosives.

Document WO2015199556 describes a procedure for the manufacture of ANFO, based on ammonium nitrate and filtered and purified waste oil. The process involves the following stages: The filter truck removes the waste or recycled oil from the collection center; through a discharge hose the product enters through the man access of the truck where the first 1 mm filtration is carried out; the waste oil is transported to the location points of the explosives factory trucks; the filter truck pumps and drives the waste oil through two 30 micron series filters (second filtration) and then through a gallon counter; the filtered waste oil is expelled with a swing gun into the fuel-mixer tank of the explosives mixer truck; the explosives mixer truck integrates the double filtered waste oil into the ammonium nitrate to produce ANFO. To fulfill this function, the filter truck specially developed for this process is made up of the following components: Cistern tank: used for waste oil storage; Ventilation valve: used for oxygen inlet to the tank for free flow of waste oil, pneumatically actuated; Four man access or upper inlet holes used for pre-filtration of recycled oil in a 1 mm solids retention screen; Mixer: used for mixing and circulation of recycled oil; Cleaning valves: used to remove the sludge which forms at the bottom of the cistern tank as a result of the union of particles that passed through the first filter; Pump: used for the suction of the waste oil and pressurized delivery to the mixing truck; Suction valve: used for the outlet of the waste oil to the pump; Suction filter: used for the cleaning of the waste oil up to 0.5 mm; Hydraulic motor: allows the waste oil pump to rotate; Contometer: allows the display of the gallons of waste oil being sent to the mixer truck; Dispensing valve: used to control the filling of the mixer truck tank with waste oil; and Chassis: vehicle used for the transfer of the components for the storage and recirculation of waste oil.

Document CN2013148322 describes a vehicle or truck for a porous cold mixed granular ANFO mix. This vehicle includes a chassis, exhaust pipes, hydraulic systems, radiator assembly, fuel system, electric control system, fender assembly. The truck is equipped with a dry material tank. The dry material is transported through a body screw, an oblique screw and a side screw. The fuel is moved to the side screw via a pump. After the side screw mixes the dry material and fuel evenly, the mixture is transported to a blast hole. The side screw is equipped with a lifting cylinder and a balancing device and can ensure high stability and high precision in the transmission of explosives.

Finally, document no. CN202415397 describes a vehicle for mixing and loading a mixed emulsion of ANFO. This vehicle includes a body and a chassis, which also includes: a primary storage system and secondary systems, an auger mixing system and a control system, and pump-fed distribution systems. The main silo system comprises a base emulsion, and deposits of modifiers of the physical density of ammonium nitrate. The system includes a diesel auxiliary tank, which is equipped with a diesel pump. An auger system supplies a sequentially arranged main auger conveyor.

All of these technologies can partially solve the problem, however, they do not allow 100% on-site production of the explosive, as they require additional elements. In particular, the solution proposed by WO2015199556 requires both a mixer truck and a filter truck, making the process for manufacturing explosives on site more complex and inefficient.

SUMMARY OF THE INVENTION

The present invention relates to a transport vehicle and the associated process, intended for the use of ALR/FO (Waste Lubricating Oils/Fuel Oil) mixture, in any of the proportions necessary for the manufacture of bulk product lines in situ, without having to resort to the installation of traditional fixed plants or modular plants. The conventional process considers a static, fixed installation with three tanks (20/30/20 m3), where an operator previously manufactures the ALR/FO mixture of up to 20,000 liters, and the factory trucks have to go to this point to load the mixture. There is no possibility of changing the proportions of the mixtures until the already manufactured mixture is exhausted. In its processes, the plant recirculates this mixture in order to homogenize it; it works like a service station.

This invention provides a series of advantages: it is more versatile than a fixed plant, since it can be moved, it eliminates the use of supply trucks (for oil and fuel oil), which are normally used in a fixed plant, and therefore reduces operating costs. This allows the time for transferring the explosive materials to be reduced, and also reduces the logistical and management time required for this. The invention can be re-supplied on site to a factory truck, a range of mixtures can be manufactured according to the needs of each customer, only what is actually required is manufactured, and, in principle, the processing of a competent authority is not required for its operation. The technology is a mobile plant and can be implemented at any mining site and eliminates the need for storing explosive materials.

This invention also makes it possible for the operating costs to be reduced, while increasing productivity. In environmental terms, the vehicle used in the present invention helps the carbon footprint to be reduced, and therefore creates a sustainable solution for the loading and use of explosives.

DETAILED DESCRIPTION OF THE INVENTION

Figure 1:
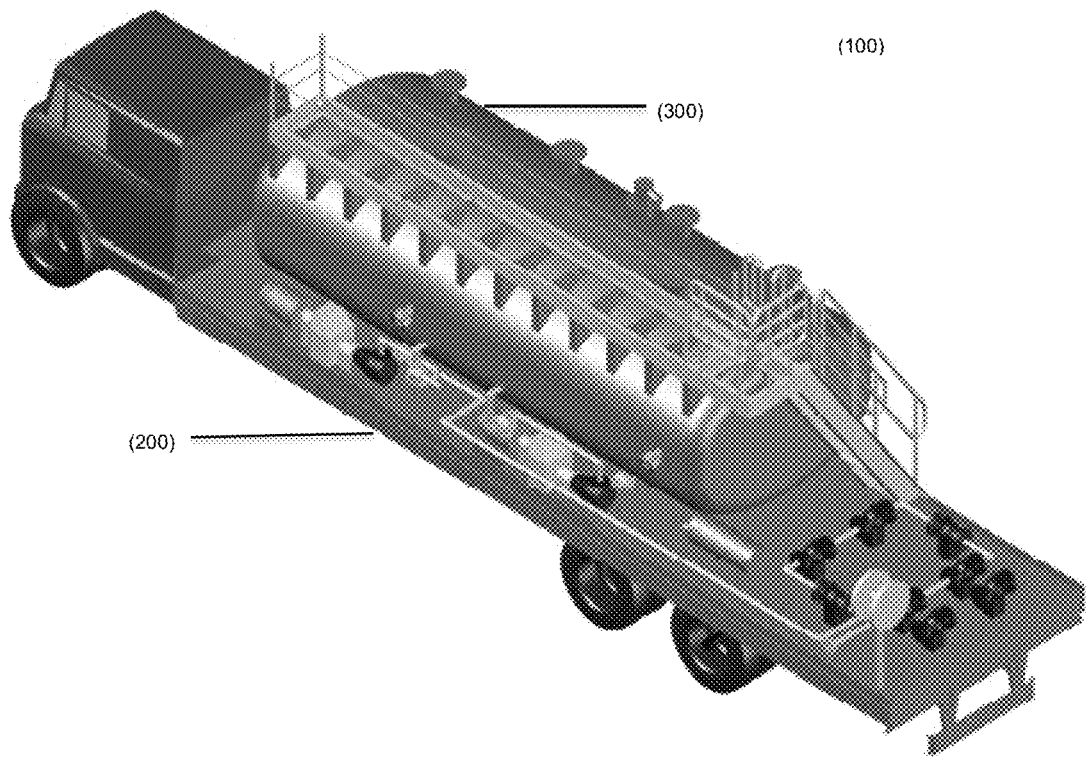
FIG. 1 represents a perspective view of the entire vehicle, according to a type of the invention.
Figure 2:
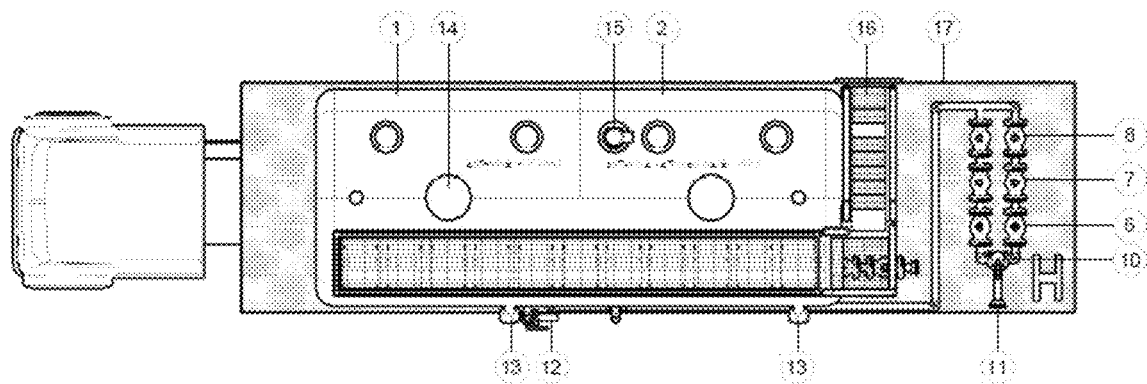
FIG. 2 represents a top view of the vehicle, according to a type of the invention.
Figure 3:
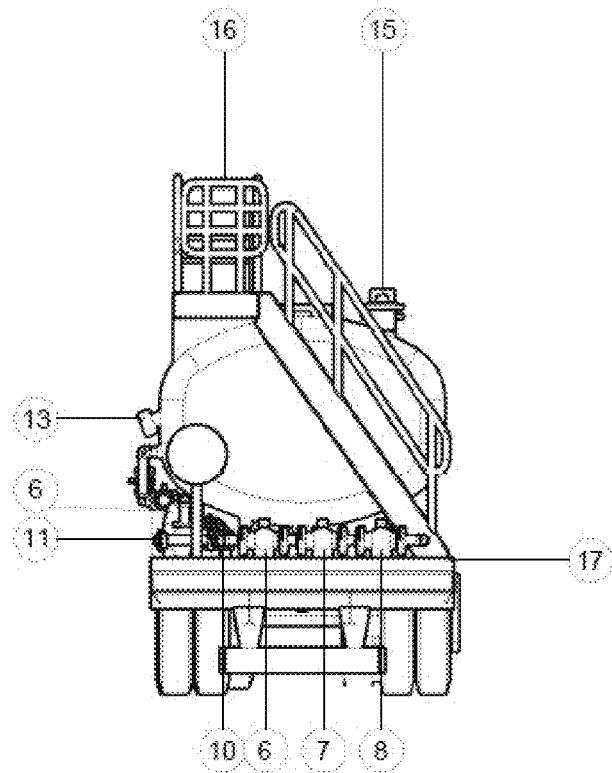
FIG. 3 represents a back view of the vehicle, according to a type of the invention.
Figure 4:
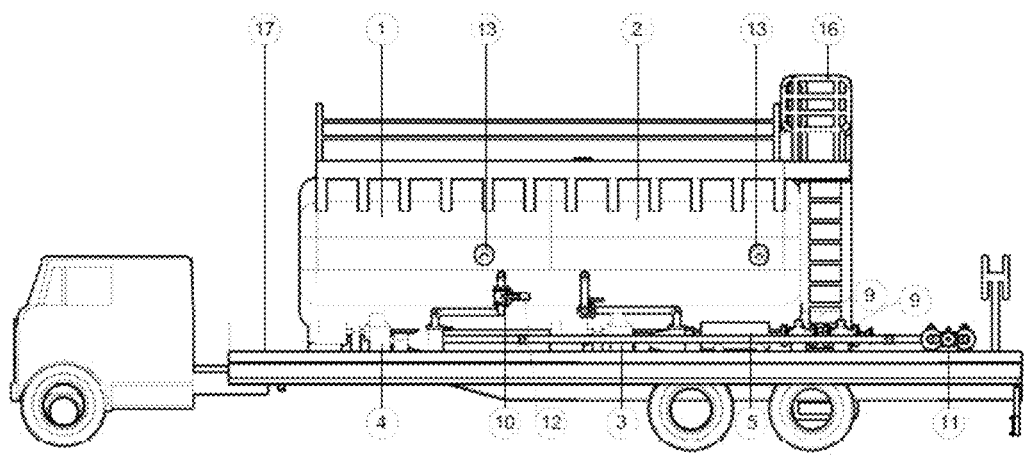
FIG. 4 represents a left view of the vehicle, according to a type of the invention.
Figure 5:
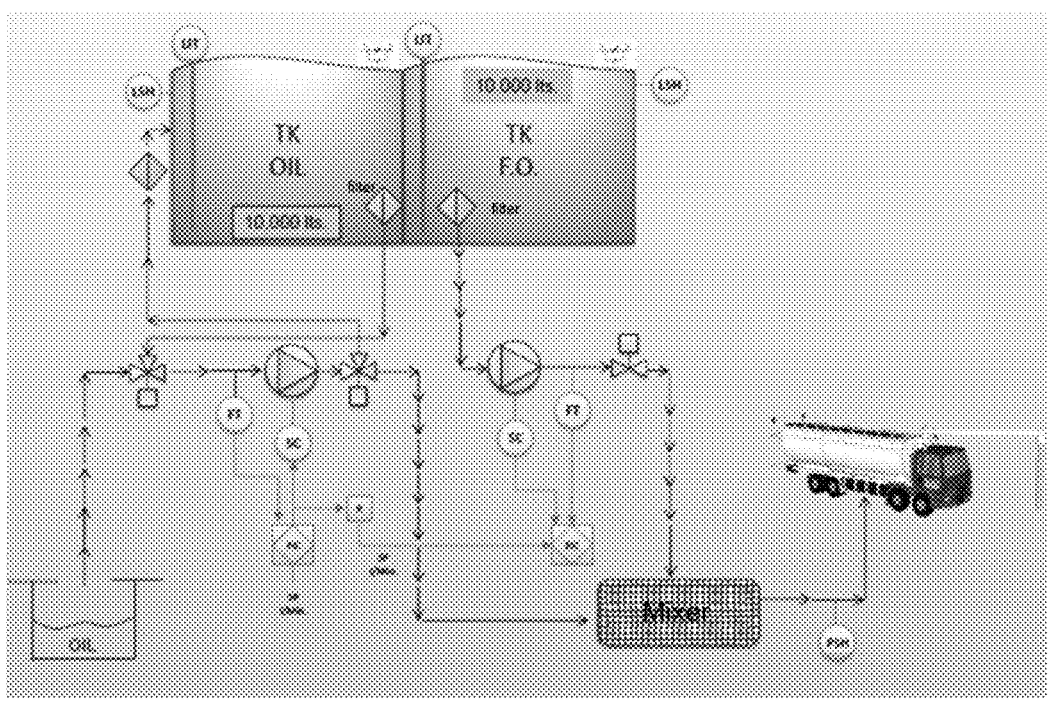
FIG. 5 represents an outline of the process carried out by the vehicle, according to a type of the invention.

The present invention relates to a transport vehicle (100) and the associated process. This vehicle (100) is preferably intended for the production of ALR/FO (waste lubricating oils/Fuel Oil) mixture.

The vehicle (100) is preferably mounted on a chassis (200) and comprises at least one metal tank (300), preferably made of stainless steel, where the tank (300) is divided internally into at least two compartments (1, 2), the first compartment for ALR (1), the second compartment for FO (2), with their own wave-breaks. Each of these compartments (1, 2) has a capacity of at most 10,000 liters and can be expanded according to the requirements. Each of the compartments (1, 2) in turn comprises a respective recirculation system, i.e. an ALR recirculation system (3) and a FO recirculation system (4). These recirculation systems (3, 4) are preferably operated automatically, either through electric or hydraulic means. The compartments (1, 2) also comprise a number of product loading lines, at least one rapid filling system (13) for compartments (1, 2) of ALR and FO respectively, at least one traditional manual filling system (11, 12), where the traditional manual filling system (11, 12) comprises an ALR loading system (11) and a FO loading system (12). The traditional filling system also includes the respective lids positioned on the upper layer of each compartment (1, 2).

The vehicle (100) also comprises a logical control system with at least one actuating panel, preferably a touch panel, for the process control carried out by the vehicle.

The vehicle (100) also includes at least one actuating reel, preferably pneumatic, to drive at least one hose, preferably with a Wiggins dispenser. The vehicle (100) also has at least one static mixer (5), preferably with perforated discs. At least one static mixer (5) is preferably made of polyamide (Tecnil or similar), with a length ranging from 50 to 100 cm (preferably 80 cm), and a diameter ranging from 30 to 50 cm (preferably 38 cm), with an overpressure safety system, where the safety system includes a recirculation system to the ALR compartment.

The safety system for the compartments (1, 2) includes a plurality of vent valves (15), preferably double acting vent valves, at least one man access (14), at least one battery, a plurality of filters for the suction of recycled oil (6, 7, 8) and at least two filters (9) for direct supply to manufacturing equipment, where the flow for these filters for the suction of recycled oil (6, 7, 8) and filters (9) for direct supply comes from a distribution valve (10), preferably a three-way valve. The energy required to drive the pump motors and the automatic mixing control is provided by a battery pack with an independent charging system, used to drive electric motors. In one type of the invention, the man access (14) is preferably 500 mm with standardized lids for the transport of fuels. In one type of the invention, there are preferably six filters for the suction of recycled oil (6, 7, 8) (two of 150 microns (6), two of 125 microns (7) and two of 105 microns (8)) and two filters for direct feeding (9) to the manufacturing equipment, preferably of 75 microns. In one type of the invention, the battery pack is comprised of batteries of at least 200 amperes.

The vehicle (100) also has at least one inspection scale (16) to allow access to the upper part of the compartments (1, 2) and to the man access (14), and at least one anti-spill tray (17) preferably located in the filter area, to reduce the risk of spillage to the floor during operation.

The vehicle (100) operation begins when the operator fills each of the compartments (1, 2) of the tank (300) with recycled lubricated oil (ALR) on one side and with Fuel Oil on the other. It is equipped with at least one rapid filling system (13) for filling, preferably a Wiggins system. Failing this, the vehicle (100) can be manually filled via the lids positioned on the top cover of each compartment (1, 2). The mixture to be used is selected through the control panel. The control panel acts on the pump motors (3, 4) through a variable frequency controller, with the mixture initially formulated by the systems to activate ALR/FO mixtures, in variable proportions, preferably in proportions of 50%/50% (option 1), 60%/40% (option 2) and 75%/25% (option 3), depending on the quality and purity of the recycled oil. However, the mixing control and process system allows for a range of mixtures, from 0% oil to 90% oil in the ALR/FO mixture.

The vehicle (100) for transport and associated process formulates, manufactures and records the liters of ALR/FO mixture that are transferred to the explosives factory trucks, by means of a pneumatically actuating reel where the operator can handle the hose from the dispenser with the rapid filling system. At that instant, the operator connects a quick fill gun, preferably a Wiggins fill gun, to each of the explosives factory trucks, performs the filling, and the system automatically cuts off when the tank of the explosives factory truck is full.

LIST OF REFERENCES (1) ALR compartment
(2) FO compartment
(3) ALR pump system
(4) FO pump system
(5) Static mixer
(6) Recycled oil suction filters (150 microns)
(7) Recycled oil suction filters (125 microns)
(8) Recycled oil suction filters (105 microns)
(9) Filters for direct feeding
(10) Distribution valve
(11) ALR loading system
(12) FO loading system
(13) Fast filling system
(14) Manhole
(15) Vent valves
(16) Inspection scale
(17) Anti-spill tray
(100) Vehicle
(200) Chassis
(300) Tank

The invention claimed is:

1. A transport vehicle intended primarily for the manufacture of ALR/FO (waste lubricating oils/Fuel Oil) mixture, preferably mounted on a chassis, and comprising at least one metal tank, CHARACTERISED because said metal tank is divided internally into at least two compartments having respective wave-breaks, wherein each compartment comprises a pump system, a plurality of lines for recharging products, at least one quick-filling system for respective FO and ALR compartments, at least one manual traditional filling system, and the vehicle comprises at least one logical control system having at least one actuating panel, at least one actuating reel for the actuation of at least one hose, and at least one static mixer for the ALR/FO mixture having an overpressure safety system, wherein said safety system includes a recirculation system to the ALR compartment, a plurality of double-acting vent valves, at least one man access, at least one battery, a plurality of filters for the suction of recycled oils and at least two filters for direct supply to manufacturing equipment.

2. The vehicle according to claim 1, CHARACTERIZED because each of these compartments has a capacity of at most 10,000 liters.

3. The vehicle according to claim 1, CHARACTERIZED because each of the compartments includes a recirculation system.

4. The vehicle according to claim 3, CHARACTERIZED because the recirculation system includes automatic activation.

5. The vehicle according to claim 4, CHARACTERIZED because the automatic activation can be either electric or hydraulic.

6. The vehicle according to claim 1, CHARACTERIZED because the traditional manual filling system comprises the respective covers positioned on the upper cover of each compartment.

7. The vehicle according to claim 1, CHARACTERIZED because it also includes a logical control system with at least one actuating panel, for process control carried out by the vehicle.

8. The vehicle according to claim 1, CHARACTERIZED because the actuating panel is a touch panel.

9. The vehicle according to claim 1, CHARACTERIZED because the actuating reel with at least one hose is preferably pneumatic.

10. The vehicle according to claim 9, CHARACTERIZED because the actuating reel with at least one hose is a Wiggins dispenser.

11. The vehicle according to claim 1, CHARACTERIZED because it preferably has six filters for suction.

12. The vehicle according to claim 11, CHARACTERIZED because it has two filters for direct feeding to the manufacturing equipment.

* * * * *